United States Patent
Lake

(10) Patent No.: US 7,739,652 B2
(45) Date of Patent: *Jun. 15, 2010

(54) DETERMINING SOFTWARE COMPLEXITY

(75) Inventor: John Michael Lake, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 1628 days.

This patent is subject to a terminal disclaimer.

(21) Appl. No.: 10/801,369

(22) Filed: Mar. 16, 2004

(65) Prior Publication Data

US 2005/0210440 A1 Sep. 22, 2005

(51) Int. Cl.
*G06F 9/44* (2006.01)

(52) U.S. Cl. .................... 717/101; 717/120

(58) Field of Classification Search ......... 717/101–105, 717/120–123; 707/203
See application file for complete search history.

(56) References Cited

U.S. PATENT DOCUMENTS

| | | | |
|---|---|---|---|
| 4,558,413 A * | 12/1985 | Schmidt et al. | 707/203 |
| 4,809,170 A * | 2/1989 | Leblang et al. | 717/122 |
| 5,649,200 A * | 7/1997 | Leblang et al. | 717/122 |
| 5,659,735 A * | 8/1997 | Parrish et al. | 707/10 |
| 5,729,746 A | 3/1998 | Leonard | 395/701 |
| 5,960,196 A * | 9/1999 | Carrier et al. | 717/122 |
| 6,223,343 B1 * | 4/2001 | Hopwood et al. | 717/101 |
| 6,343,297 B1 * | 1/2002 | D'Anjou et al. | 707/104.1 |
| 6,397,202 B1 * | 5/2002 | Higgins et al. | 706/47 |
| 6,496,974 B1 * | 12/2002 | Sliger et al. | 717/106 |
| 6,542,907 B1 * | 4/2003 | Cohen | 707/203 |
| 6,658,643 B1 | 12/2003 | Bera | 717/101 |
| 6,681,382 B1 * | 1/2004 | Kakumani et al. | 717/122 |
| 6,715,108 B1 * | 3/2004 | Badger et al. | 714/38 |
| 6,938,109 B1 * | 8/2005 | Sliger et al. | 710/68 |
| 6,981,245 B1 * | 12/2005 | Schwabe | 717/126 |
| 6,986,132 B1 * | 1/2006 | Schwabe | 717/168 |
| 7,047,257 B2 * | 5/2006 | Fletcher et al. | 707/201 |
| 7,069,541 B2 * | 6/2006 | Dougherty et al. | 717/122 |
| 7,146,608 B1 * | 12/2006 | Newman et al. | 717/168 |
| 2008/0005720 A1 * | 1/2008 | Lake | 717/101 |

OTHER PUBLICATIONS

Chaitin, G., "A Theory of Program Size Formally Identical to Information Theory", Journal of the ACM 22, pp. 329-340. 1975.
Campani, C., "Characterizing the Software Development Process: A New Approach Based on Kolmogorov Complexity", Feb. 2, 2004.

* cited by examiner

*Primary Examiner*—Ted T Vo
(74) *Attorney, Agent, or Firm*—Steven E. Bach

(57) ABSTRACT

Methods, apparatus, and computer program products for determining software complexity. A plurality of versions of a software module whose complexity is to be determined are compressed. Lengths of the compressed versions are compared, one with another, to provide complexity metrics.

11 Claims, 2 Drawing Sheets

DETERMINING SOFTWARE COMPLEXITY

FIELD OF THE INVENTION

The invention relates to the field of software engineering, and more particularly to methods, apparatus, and computer program products for determining software complexity.

BACKGROUND

Software has become increasingly complex as processor capability, memory density, and users' expectations have grown. As a result, methods and tools for managing software development projects have become increasingly important, including methods for determining software complexity to be used in estimating, for example, how many defects are expected to occur in a software component, how many hours of development time are expected to be needed for the completion of a project, and so forth.

Today, such estimates are normally based on counts of lines of code, together with some simple rules for determining what, roughly, constitutes a line of code. For example, a certain development time and a specified number of defects may be expected per thousand lines of code. This method may be called generically the KLOC method.

The KLOC method, while certainly useful, has significant drawbacks. These drawbacks are a product of the highly variable nature of software components. Some components are rich in unique code, whereas other components include substantial repetitions, spaces, blank lines, comments, and so forth. Thus, when two software components are compared using the KLOC method, where one component is rich in unique code while the other is highly repetitive and full of comments, the resulting estimates will be inconsistent. The two estimates might be numerically the same, for example, whereas in reality the software that is rich in unique code is rationally expected to be more difficult to develop, and therefore to require more development time and be more susceptible to defects. Furthermore, the KLOC method is strongly tied to the properties of the particular programming language in question, as some languages are inherently more dense than others.

Thus, there is a need for a language-independent way to determine software complexity consistently, so that software project estimates such as expected development time, expected numbers of defects, and so forth, may be determined more accurately than is possible today.

SUMMARY

Embodiments of the invention include methods, apparatus, and computer program products for determining software complexity. A plurality of versions of a software module whose complexity is to be determined are compressed. Lengths of the compressed versions are compared, one with another, to provide complexity metrics.

DETAILED DESCRIPTION

The present invention includes language-independent methods, apparatus, and computer program products for determining software complexity more accurately and consistently than is possible using the KLOC method.

Measures are taken of a plurality of different forms of a software component whose complexity is to be determined, and the measures are then compared with one another to reveal characteristics of the software component that are otherwise obscured. More particularly, a plurality of versions of the software are determined, each of the versions is compressed, and the lengths of the compressed versions are compared with each other to provide software complexity metrics.

As an aid to understanding the invention, let an exemplary software module M be constructed from three strings, which are called here p, p', and p". Let $K(x)$ be the KLOC measure of the complexity of string x. The complexity of the module M would then be the sum of the lengths of the three strings, i.e., $K(M)=K(p)+K(p')+X(p")$.

Suppose, however, that the strings are not independent, but rather that p' is dependent upon p, i.e., $p'=f(p)$, and p" is dependent upon p and p', i.e., $p"=g(p, f(p))$. When $f(.)$ and $g(.)$ are relatively simple functions, for example substitutions of identifiers, it is more reasonable and more useful for purposes such as estimating the number of defects in the module, to take into account conditional dependencies to represent the incremental contributions of p' and p". Thus, a complexity measure according to the present invention, which is called here $C(M)$, may be described in terms of the complexity of p, of p' given p, and of p" given p and p', i.e., $C(M)=C(p)+C(p'|p)+C(p"|p, p')$.

Figure 1:
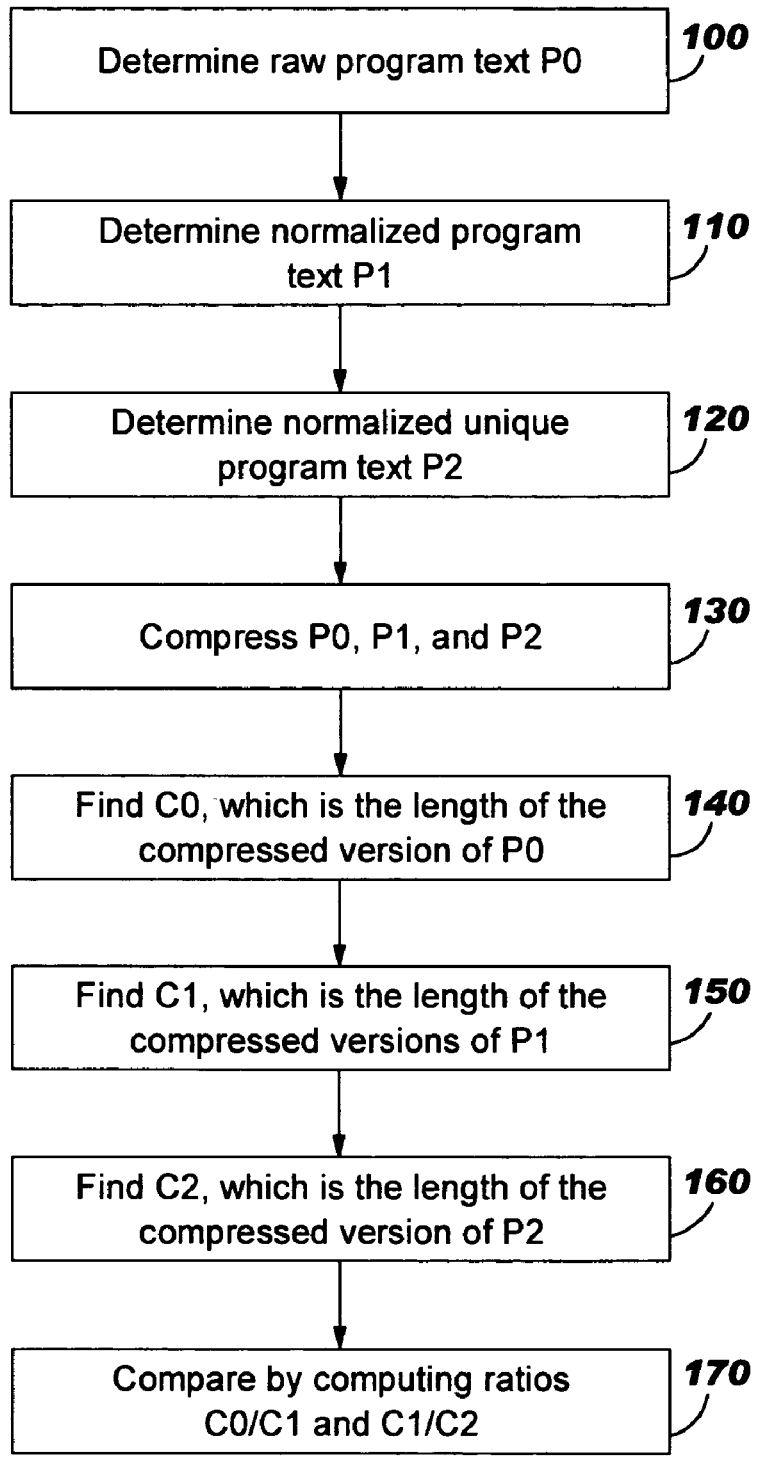
FIG. 1 is a flowchart that illustrates an exemplary method for providing program complexity metrics according to the present invention.

Turning now to a preferred embodiment of the invention, which may be understood in the theoretical context just described and with reference to FIG. 1, let P0 be the raw program text of P, let P1 be the normalized program text of P, and let P2 be the normalized unique program text of P. Here, the raw text P0 is found by collecting the program files of P into one file. In a preferred embodiment of the invention, the normalized program text P1 is found by eliminating comments from P0, normalizing sequences of spaces into a single space, and then sorting the remaining lines into lexicographic order. This way of normalizing the program text is merely illustrative of the invention rather than limiting, however, as there are many other ways to normalize, all of which fall within the scope of the invention. In another exemplary embodiment, the normalized program text P1 may be found by reformatting the program text P0 according to a stylistic standard, so that minor differences in formatting style are removed. This approach may be especially useful when the software in question has a long life, as style fashions tend to evolve over time. The normalized unique program text P2 may be found by eliminating duplicate lines in P1.

Operations of a corresponding method are shown in FIG. 1. From P, the raw program text P0 is determined (step 100), the normalized program text P1 is determined (step 110), and the normalized unique program text P2 is determined (step 120), all as just described.

Texts P0, P1, and P2 are then compressed (step 130). In a preferred embodiment of the invention, compression is provided by application of the open source bzip2 program, for example version 1.0.1 of bzip2. The use of this particular compression algorithm is merely illustrative of the invention rather than limiting. The bzip2 compression method, which relies on a block sorting algorithm and numeric coding, is well known to those skilled in the art, and therefore will not be described in detail here. Further information regarding bzip2 may be found on the World Wide Web at, for example, Uniform Resource Locator digistar.com/bzip2/.

Measures C0, C1, and C2 are then found from the compressed versions of P0, P1, and P2, respectively (steps 140, 150, 160). Measure C0 is the length of the compressed version of P0. Measure C1 is the length of the compressed version of P1. Measure C2 is the length of the compressed version of P2. The resulting measures C0, C1, and C2 are compared by computing the ratios C0/C1 and C1/C2 (step 170).

Measure C0, which results from compression of the raw program text, may be used rather than a KLOC count in estimates of expected development times and expected numbers of defects. Measures C1 and C2 address the question of incremental contributions. Thus, the ratios C0/C1 and C1/C2 are proportional to the redundancy of the implementation of P and the propagation of defects, respectively, and may be used as metrics of these attributes.

Figure 2:
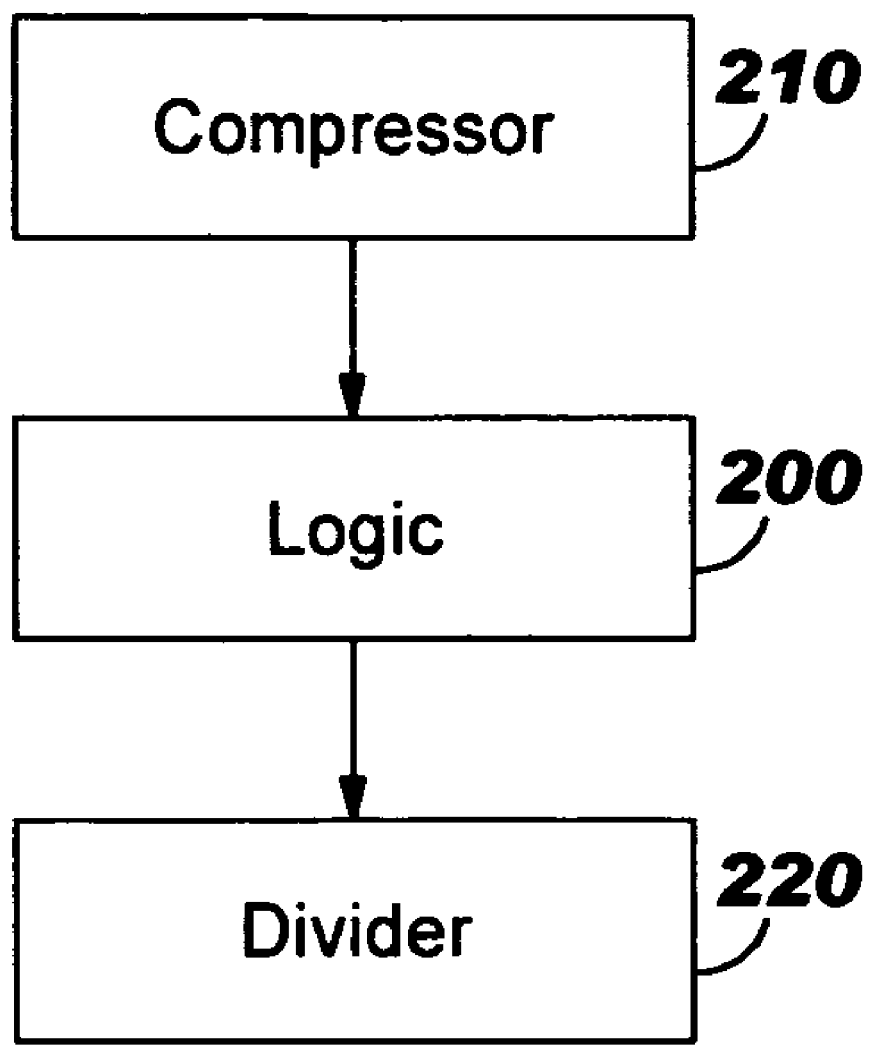
FIG. 2 is an illustrative embodiment of apparatus according to the present invention.

As shown in FIG. 2, apparatus according to the present invention includes logic 200, which may itself include memory (not shown), a compressor 210, and a divider 220. These elements are shown as separate in FIG. 2 only for descriptive convenience. All may be implemented using a stored-program-control processor, such as a microprocessor.

The logic 200 determines the raw program text P0, the normalized program text P1, and the normalized unique program text P2 as described above. The compressor 210 compresses the texts P0, P1, and P2. In a preferred embodiment, the compressor uses release 1.0.1 of bzip2. The logic 200 determines the measures C0, C1, and C2, which are, respectively, the lengths of the compressed versions of P0, P1, and P2. The divider 220 computes the ratios C0/C1 and C1/C2.

Embodiments of the invention further include program storage devices readable by machines, tangibly embodying programs of instructions suitable for implementing the methods described above and for controlling processor implementations of the apparatus described above.

Thus, as described above, the present invention provides language-independent methods, apparatus, and computer program products for determining software complexity metrics that are more accurate and consistent than measures based upon the KLOC method. The foregoing description of the invention is illustrative rather than limiting, however, and the invention is limited in its scope only by the claims appended here.

I claim:

1. Apparatus for determining complexity of a software component, comprising:

logic for determining a plurality of versions of the software component and for finding lengths of compressed versions of the plurality of versions of the software;

means for compressing each of the versions, to provide the compressed versions;

means for comparing the lengths of the compressed versions; and means for providing a software complexity metric comprising a comparison of the lengths of the compressed versions.

2. Apparatus for determining complexity of a software component, comprising:

logic for creating raw program text and normalized program text of the software component and for finding lengths of compressed raw program text and compressed normalized program text;

means for compressing the raw program text and the normalized program text to provide the compressed raw program text and the compressed normalized program text, respectively; and means for finding a ratio of the length of the compressed raw program text to the length of the compressed normalized program text; and means for providing a complexity metric comprising the ratio.

3. Apparatus for determining complexity of a software component, comprising:

logic for creating normalized program text and normalized unique program text of the software component and for finding lengths of compressed normalized program text and compressed normalized unique program text;

means for compressing the normalized program text and the normalized unique program text to provide the compressed normalized program text and the compressed normalized unique program text, respectively; and means for finding a ratio of the length of the compressed normalized program text to the length of the compressed normalized unique program text; and means for providing a complexity metric comprising the ratio.

4. A program storage device readable by machine, tangibly embodying a program of instructions executable by machine to perform method steps for determining complexity of a software component, said method steps comprising:

creating a plurality of versions of the software component;

compressing each of the versions, to provide compressed versions;

finding lengths of the compressed versions;

comparing the lengths of the compressed versions; and providing a software complexity metric comprising a comparison of the lengths of the compressed versions.

5. The program storage device of claim 4, wherein the plurality of versions comprises raw program text.

6. The program storage device of claim 4, wherein the plurality of versions comprises normalized program text.

7. The program storage device of claim 4, wherein the plurality of versions comprises normalized unique program text.

8. The program storage device of claim 4, wherein the step of comparing comprises a step of finding a ratio using the length of the compressed version of raw program text and the length of the compressed version of normalized program text.

9. The program storage device of claim 4, wherein the step of comparing comprises a step of finding a ratio using the length of the compressed version of normalized program text and the length of the compressed version of normalized unique program text.

10. A program storage device readable by machine, tangibly embodying a program of instructions executable by machine to perform method steps for determining complexity of a software component, said method steps comprising:

creating raw program text and normalized program text of the software component;

compressing the raw program text and the normalized program text to provide compressed raw program text and compressed normalized program text, respectively;

finding the length of the compressed raw program text and the length of the compressed normalized program text;

finding a ratio of the length of the compressed raw program text to the length of the compressed normalized program text; and providing a software complexity metric comprising the ratio.

11. A program storage device readable by machine, tangibly embodying a program of instructions executable by machine to perform method steps for determining complexity of a software component, said method steps comprising:
  creating normalized program text and normalized unique program text of the software component;
  compressing the normalized program text and the normalized unique program text to provide compressed normalized program text and compressed normalized unique program text, respectively;
  finding the length of the compressed normalized program text and the length of the compressed normalized unique program text;
  finding a ratio of the length of the compressed normalized program text to the length of the compressed normalized unique program text; and
  providing a software complexity metric comprising the ratio.

\* \* \* \* \*